| FILM SENSITIVITY IN DIN | MOTOR SPEED | | |
|---|---|---|---|
| | 10 | 16 | 25 |
| 13 | B(C) | C(D) | D(E) |
| 15 | A(B) | B(C) | C(D) |
| 17 | (A) | A(B) | B(C) |

INVENTORS
HELMUT MAYR
RICHARD PELTE

United States Patent Office 3,444,798
Patented May 20, 1969

3,444,798
PHOTOGRAPHIC CAMERA WITH AN AUTOMATIC EXPOSURE CONTROL DEVICE
Helmut Mayr, Am. Kosttor 1, Munich 2, Germany, and Richard Pelte, Heimgartenstrasse 6, Munich 9, Germany
Filed May 9, 1966, Ser. No. 548,598
Claims priority, application Germany, May 11, 1965, A 49,174
Int. Cl. G03b 9/02; G01j 1/04
U.S. Cl. 95—64                                           32 Claims

ABSTRACT OF THE DISCLOSURE

A motion picture camera wherein a set of manually and/or automatically operated switches can adjust the diaphragm by connecting into the circuit of the exposure meter one or more resistors to account for the speed of the motor which operates the shutter and the film transporting mechanism, for the presence or absence of a corrective filter, for the speed of the film, and/or for the selected exposure time.

---

The present invention relates to cameras in general, and more particularly to improvements in cameras wherein the diaphragm can be adjusted as a function of the intensity of incident light. Still more particularly, the invention relates to improvements in cameras, especially motion picture cameras, wherein the exposure meter which selects the size of the diaphragm aperture may be influenced by one or more additional factors.

It is an object of the present invention to provide a camera wherein artificial-light film may be used for making exposures in artificial light or in daylight.

Another object of the invention is to provide a motion picture camera wherein the selection of any given motor speed automatically results in proper adjustment of the diaphragm.

A further object of the invention is to provide a camera wherein the diaphargm is properly adjusted in response to insertion of a given type of film so as to account for sensitivity of such film.

An additional object of the invention is to provide a novel electric circuit which may be utilized in a camera of the above outlined characteristics.

Still another object of the present invention is to provide an electric circuit which comprises a relatively small number of compensating resistors and wherein each such resistors may be used to effect two or more different adjustments of the diaphragm.

Another object of our invention is to provide a motion picture camera for use with magazines of the type which can automatically effect certain adjustments in the exposure control, not only in response to insertion but also in response to removal of such magazines from the housing of the camera.

A concomitant object of the invention is to provide a camera wherein all such factors which influence the quality of an exposure may be considered by appropriate and fully automatic selection of compensating resistors.

A further object of the instant invention is to provide a motion picture camera wherein the film is transported by means of an electric motor and wherein the motor circuit is deenergized in a fully automatic way when the user removes the film magazine.

An additional object of the invention is to provide a camera for operation with a flash unit and to construct the camera in such a way that the exposure control is automatically adjusted for operation in artificial light when the flash unit is properly attached to the housing of the camera.

An ancillary object of the invention is to provide the camera with manually operable adjusting means which can influence the size of the diaphragm aperture independently of the automatic exposure control.

Another object of the invention is to provide a motion picture camera wherein a conversion filter is automatically moved into or away from the path of incoming light when the user inserts or removes a film-containing magazine and/or when the user attaches or detaches a flash unit.

Briefly stated, one feature of the present invention resides in the provision of a novel camera, particularly a motion picture camera having motor measn for advancing the film at a plurality of different speeds and shutter means providing a plurality of exposure times. The camera comprises an adjustable diaphragm, an exposure meter coupled with the diaphragm and including light-sensitive means for adjusting the diaphragm as a function of the brightness of a subject, a source of electrical energy connected in circuit with the light-sensitive means, a series of compensating resistor means, at least one adjustable main selector switch means, and a plurality of adjustable auxiliary selector switch means controlled by the main selector switch means and arranged to connect selected resistor means into the aforementioned circuit to thereby effect further adjustments of the diaphragm as a function of factors other than the brightness of a subject, and adjusting means for adjusting the switch means as a function of such factors.

Each of the resistor means may offer a different resistance to the flow of electric current, and the difference between the resistances of the resistor means of the aforementioned series may be the same. The factors which can influence adjustment of the diaphragm in addition to the brightness of a subject may include the speed at which the motor of a motion picture camera is set for advancing the film, the exposure time, the sensitivity of film, and at least one additional factor, for example, a filter factor.

The main selector switch means comprises at least one main contact and a plurality of complementary contacts each of which is connected with one of the auxiliary selector switch means. The adjusting means is arranged to place the main contact in current-conducting engagement with a selected complementary contact to thereby connect one or more compensating resistor means into the circuit of the light-sensitive means. For example, the main contact and the complementary contacts of the auxiliary selector switch means may be provided on two disk-shaped or rotor-shaped carriers at least one of which is movable by the adjusting means to thereby account for one or more factors which should influence the size of the diaphragm aperture.

It is further possible to provide the camera with an intergrator unit which automatically adjusts the main selector switch means and/or the auxiliary selector switch means in dependency on the sensitivity of film which is being used in the camera, in dependency on the selected speed at which the film is being transported by the motor, and/or in dependency on one or more additional factors which must be taken into consideration to make a satisfactory exposure.

The novel features which are considered as characteristic of the invention are set forth in particular in the appended claims. The improved camera itself, however, both as to its construction and the mode of manipulating the same, together with additional features and advantages thereof, will be best understood upon perusal of the following detailed description of certain specific embodiments with reference to the accompanying drawings, in which:

Figure 1:
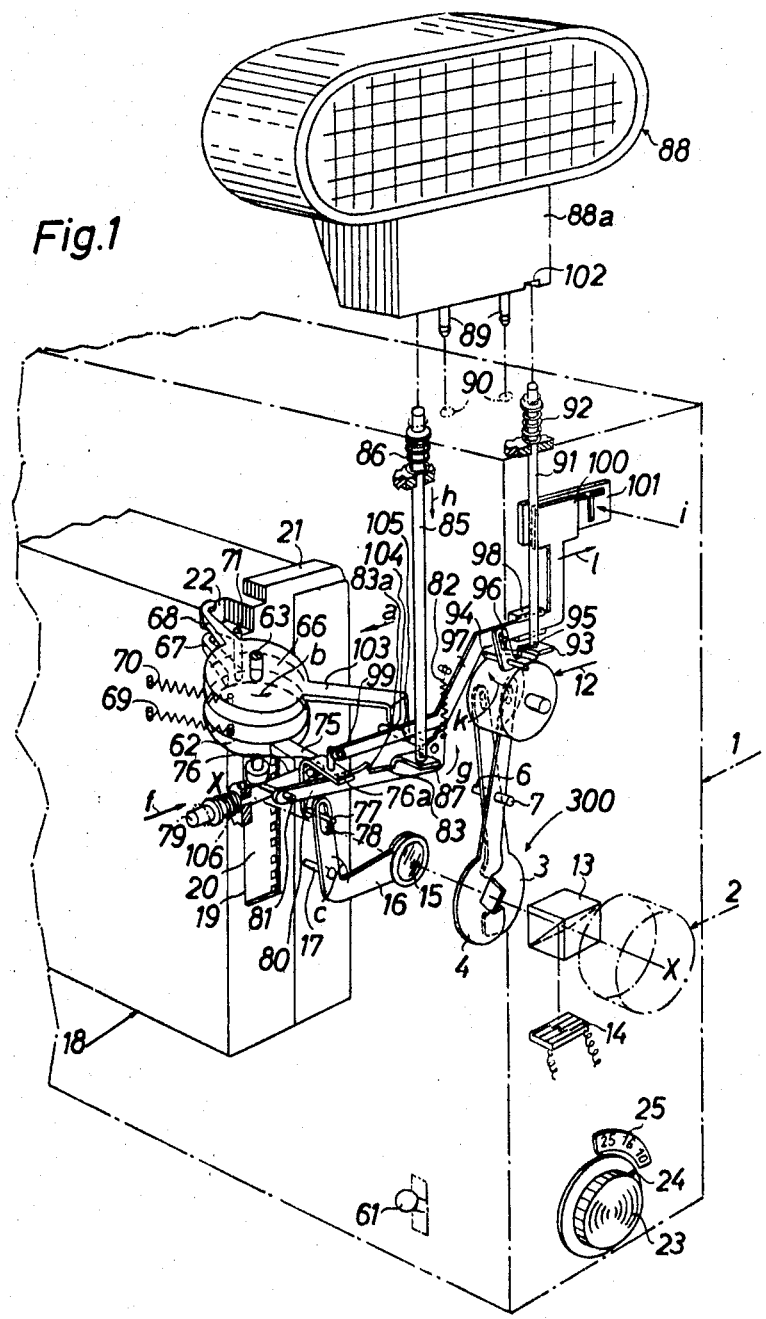
FIG. 1 is a fragmentary perspective view of a motion picture camera which embodies one form of our invention and whose housing accommodates a magazine containing a supply of artificial-light film.
Figure 2:
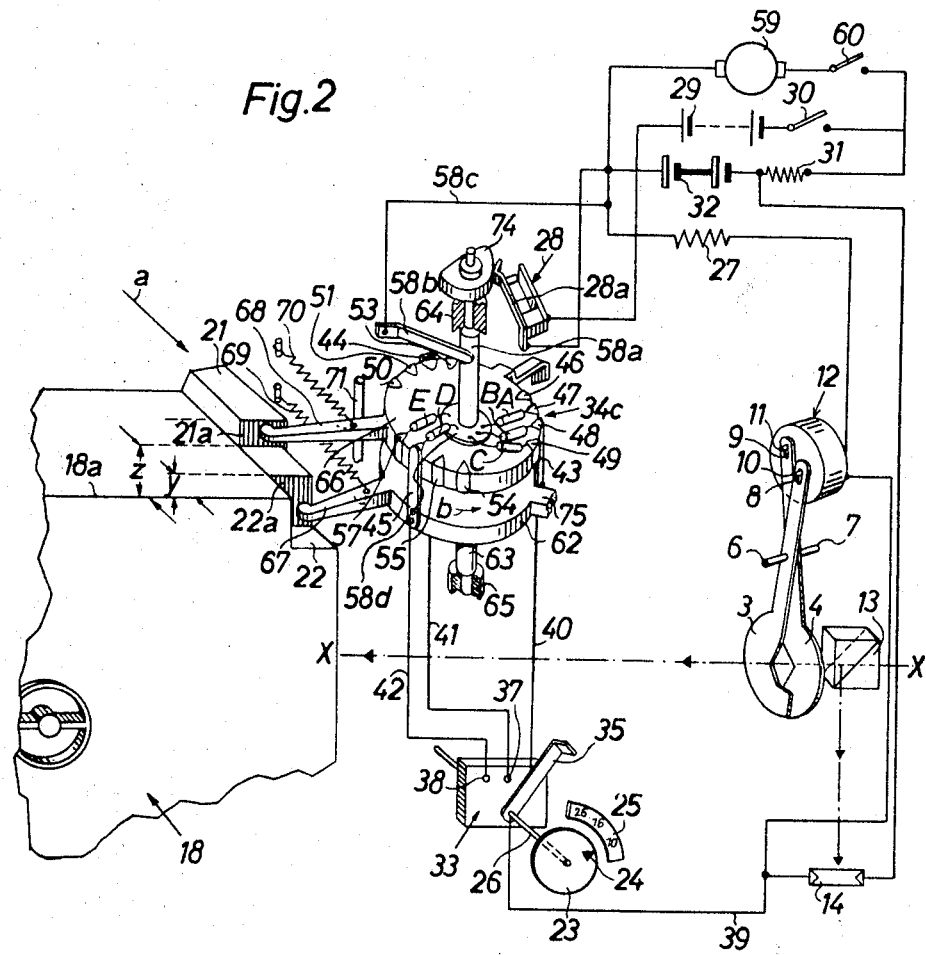
FIG. 2 is an enlarged perspective view of a detail of the structure shown in FIG. 1.
Figures 3, 4:
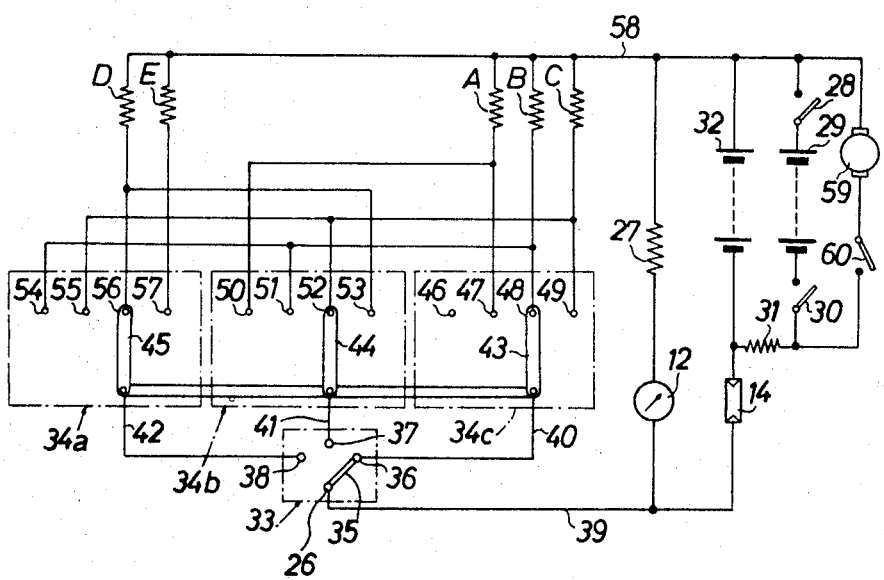
FIG. 3 illustrates the electric circuit of the camera.
FIG. 4 is a chart showing various combinations of motor speed and film sensitivity which can be used in selecting such complementary resistor means which should be connected in the electric circuit to account for the selected motor speed and film sensitivity.

Referring first to FIGS. 1 to 3, there is shown a motion picture camera having a housing 1 carrying an objective 2 which admits light rays along the optical axis X—X. Such rays can pass through the aperture defined by an adjustable diaphragm 300 which includes two blades 3, 4 located behind the objective 2 and respectively pivotable about fixed pivot pins 6 and 7. Slots 8 and 9 which are respectively provided in the upper end portions of the blades 3 and 4 receive motion transmitting pins 10, 11 connected to the movable element of a moving-coil instrument 12 forming part of an exposure meter which determines the size of the diaphragm aperture in dependency on a plurality of factors. A light deflecting prism 13 is mounted between the objective 2 and diaphragm blades 3, 4 to direct some incoming light against a light-sensitive receiver 14, preferably a resistor which is connected in circuit with the moving-coil instrument 12.

The camera further comprises a conversion filter 15 which is mounted on a holder here shown as a bell crank lever 16 and is movable between two positions to respectively extend across and away from the path of light rays which have passed through the aperture defined by the diaphragm 300. The bell crank lever 16 is rockable on a fixed pivot pin 17. One of the purposes of the conversion filter 15 is to enable the operator to use an artificial-light film for taking pictures in daylight.

The housing 1 defines a chamber which can receive a film magazine or cartridge 18 whose front panel (facing the objective 2 and diaphragm 300) has a window 19 arranged to permit light rays passing along the optical axis X—X to reach an unexposed frame of the motion picture film 20. The travel of light rays along the optical axis X—X can be interrupted by a rotary shutter of known design which is not shown in the drawings and which can provide a plurality of exposure times. The casing of the magazine 18 has two adjusting elements here shown as reference markers 21 and 22. The adjusting element or marker 21 resembles a rib which extends upwardly beyond the top panel of the magazine 18 and has a motion transmitting face 21a. The other adjusting element or marker 22 is shown in the form of a recess provided in the top and left-hand panels of the magazine 18 and bounded by a side face 22a which can transmit motion in a manner to be fully described hereinafter. These faces 21a, 22a can be respectively tracked by motion transmitting followers 68 and 67.

The front wall of the housing 1 carries a further adjusting element here shown as a speed selecting knob 23 which has an index or pointer 24 cooperating with a fixed scale 25. The knob 23 can select the speed at which the film is transported, for example, ten, sixteen or twenty-five frames per second, and is affixed to an adjusting shaft 26 shown in FIG. 2.

FIG. 3 illustrates the moving-coil instrument 12 in series with the light-sensitive receiver 14 and with a series resistor 27. The electric circuit of the exposure meter further comprises two parallel branches one of which includes a control switch 28, a battery 29 or another suitable primary source of electrical energy, a master switch 30 and a resistor 31. The components 12, 14, 27 and 29 are connected in series. The other branch comprises one or more stabilyte cells 32 which constitute a secondary source of electrical energy and are connected in parallel with the primary source 29. The moving-coil instrument 12 and resistor 27 can be connected in parallel with one of five compensating or correcting resistors A, B, C, D and E. In order to be able to connect into the circuit a selected compensating resistor (A to E), the exposure meter further includes a main selector switch 33 and a set of three auxiliary selector switches 34a, 34b, 34c.

The main selector switch 33 (hereinafter called selector for short) has a main contact or selector contact 35 which is fixed to the adjusting shaft 26 and can be moved into current-conducting engagement with either one of three complementary or secondary contacts 36, 37 and 38. A lead 39 connects the main contact 35 with one terminal of the moving-coil instrument 12. The complementary contacts 36, 37, 38 are respectively connected with main contacts or selector contacts 43, 44, 45 of the auxiliary selector switches 34c, 34b, 34a (hereinafter called auxiliaries for short) by means of leads 40, 41 and 42, respectively. The selector contacts 43, 44, 45 are respectively turnable into current-conducting engagement with complementary or secondary contacts 46–49, 50–53 and 54–57, or vice versa. The secondary contacts 46–57 are connected with the compensating resistors A–E in such a way that, while engaging the secondary contact 46, the selector contact 43 of the auxiliary 34c fails to connect any of the resistors A–C in the circuit of the moving-coil instrument 12. When respectively engaging the secondary contacts 47, 48 and 49, the selector contact 43 connects the moving-coil instrument 12 in circuit with the compensating resistors A, B and C. When it moves from secondary contact 50 to secondary contact 53, the selector contact 44 of the second auxiliary 34b respectively connects the moving-coil instrument 12 in circuit with the compensating resistors A, B, C and D. Finally, while moving from the secondary contact 54 to the secondary contact 57, the selector contact 45 of the third auxiliary 34a respectively connects the moving-coil instrument 12 in circuit with the compensating resistors B, C, D and E.

A lead 58 connects the compensating resistors A to E with the other terminal of the moving-coil instrument 12. The resistance offered by each of the resistors A to E is different and the difference between the resistances of resistors A–B, B–C, C–D and D–E is preferably the same.

The diagram of FIG. 4 illustrates various possible combinations which can be arrived at by connecting the moving-coil instrument 12 in circuit with the compensating resistors A–E. The left-hand vertical column indicates the film sensitivity in DIN norms. The top horizontal row indicates the motor speeds in numbers of frames per second. The bracketed characters in the three bottom horizontal rows indicate changes in the circuit which take place in response to movement of the filter 15 into the path of incoming light rays. For example, the character B in the box located next to the numeral 13 indicates that the moving-coil instrument 12 should be connected in circuit with the compensating resistor B when the sensitivity of the motion picture film is 13 and if the motor advances the film at ten frames per second. If the film is an artificial-light film and is to be used in daylight, the moving-coil instrument 12 will be connected in circuit with the resistor C, instead of with the resistor B. If the sensitivity of a daylight film is 13 and the motor is set to advance the film at 16 frames per second, the moving-coil instrument 12 must be conected with the resistor C. The remaining possibilities indicated in the diagram of FIG. 4 will be readily understood upon persual of the above explanations.

The battery 29 and the switches 28, 30 are connected in parallel with an electric motor 59 which serves to operate the claw pull-down or an analogous film transporting device as well as to rotate the aforementioned shutter. The motor 59 is connected in series with a motor switch 60 which can be opened or closed by a manually operable actuating member in the form of a lever 61 provided on the left-hand side wall of the housing 1 (see FIG. 1).

In the illustrated embodiment, the selector contacts 43, 44 and 45 of the auxiliaries 34c, 34b, 34a resemble resilient tongues which are fixedly secured to the periphery of a disk-shaped carrier 62 (hereinafter called rotor for short) consisting of insulating material, see FIGS. 1 and 2. The rotor 62 is fixedly secured to a shaft 63 which is journalled in bearings 64, 65 provided in the housing 1. A second disk-shaped carrier or rotor 66 of insulating material is rotatable on the shaft 63 and is located in a plane which is parallel to the plane of the rotor 62. The rotor 66 carries the three groups of secondary contacts 46–49, 50–53 and 54–57 which are recessed into the insulating material. As shown in FIG. 2, each of the selector contacts 43, 44, 45 can be brought into current-conducting engagement with each of the secondary contacts 46–49, 50–53 and 54–57, respectively. The rotor or carrier 66 further supports the compensating resistors A to E which extend substantially radially of the shaft 63 and the inner ends of which are soldered to a metallic disk 58d which is connected to a current-conducting portion 58a of the shaft 63. The shaft portion 58a is frictionally engaged by a resilient wiper 58b which is connected to a lead 58c. The parts 58a–58d together constitute the lead 58 shown in FIG. 3. The manner in which the outer ends of the resistors A–E shown in FIG. 2 are connected with the contacts 46–57 is the same as described in connection with FIG. 3.

The rotors or carriers 62, 66 are respectively rigid or integral with the aforementioned motion transmitting followers 67 and 68. Each of these followers resembles an elongated arm which extends substantially radially of the respective rotor. Return springs 69 and 70 respectively serve to bias the rotors 62, 66 in a clockwise direction, as viewed in FIG. 1, so that the followers 67, 68 respectively bear against the faces 22a, 21a of the adjusting elements or markers 22, 21. When the magazine 18 is removed from the housing 1, the springs 69, 70 urge the followers 67, 68 into abutment with a fixed stop post 71. When the post 71 is in actual contact with the followers 67 and 68, the selector contacts 43–45 are held out of engagement with the corresponding groups of secondary contacts on the rotor or carrier 66.

When the magazine 18 is inserted into the housing 1, its adjusting elements or markers 21, 22 respectively engage the followers 68, 67 and turn at least one of the rotors 62, 66 in a counterclockwise direction as indicated in FIG. 1 by an arrow b. The direction in which the magazine 18 is insertable into the housing 1 is indicated by an arrow a. The positioning of the marker 21 with reference to the remainder of the magazine 18 is such that the marker 21 is indicative of the sensitivity of film 20 which is stored in the magazine. In other words, the distance z from the face 21a to the horizontal edge 18a (see FIG. 2) between the top panel and the left-hand side panel of the magazine 18 will indicate the sensitivity of film 20. The other face 22a is either flush with the edge 18a or is located at a distance y therefrom (see FIG. 2). Depending on the location of the face 22a with reference to the edge 18a, i.e., with reference to the remainder of the magazine 18, the marker 22 will or will not rock the filter 15 when the magazine 18 is inserted into the chamber of the housing 1.

The aforementioned shaft 63 for the rotors or carriers 62, 66 further supports a trip here shown as a cam 74 which consists of insulating material or is mounted on an insulated portion of the shaft 63. The cam 74 turns with the rotor 62 in a clockwise direction (under the bias of the sping 69) when the magazine 18 is removed from its chamber in the housing 1 and, when the follower 67 engages the stop post 71, the cam 74 assumes an angular position in which it allows a resilient contact 28a of the control switch 28 to move away from the corresponding fixed contact so that the control switch 28 opens and deenergizes the electric circuit of the exposure meter. Such mounting of the cam 74 insures that the circuit of the moving-coil instrument 12 and motor 59 is deenergized or interrupted in automatic response to removal of a magazine from the housing 1 and that the control switch closes in automatic response to insertion of a magazine.

In order to effect movements of the filter 15, the rotor 62 is provided with a substantially radial extension or arm 75 (see particularly FIG. 1) which is rigidly connected with a substantially L-shaped bracket 76. One leg of the bracket 76 carries a pin 77 extending into a slot 78 provided in the lever 16 for the filter 15. The leg 76a of the bracket 76 is located in the path of a manually depressible pusher 79 which forms part of the adjusting means for the exposure meter and is mounted in the left-hand side wall of the housing 1. The outer end portion of the pusher 79 is accessible to the user of the camera so that it may be depressed by a finger.

FIG. 1 illustrates the filter 15 in operative position in which the filter extends across the path of light rays travelling along the optical axis X—X. The filter 15 automatically assumes such operative position if the magazine 18 contains a supply of artificial-light film 20 as well as when the magazine is removed from the housing 1. The magazine 18 of FIG. 1 is assumed to contain a supply of artificial-light film 20, and this is indicated by the fact that the face 22a of the adjusting element or marker 22 is spaced from the edge 18a between the top panel and the left-hand side panel of the magazine 18, i.e., that the face 22a is located at the distance y from the edge 18a. Therefore, and when the magazine 18 of FIG. 1 is inserted into its chamber, the tip of the motion-transmitting follower 67 can enter the marker 22 (which is actually a recess) and the rotor 62 is not displaced in the direction of the arrow b so that the extension 75 and bracket 76 maintain the bell crank lever 16 in the position shown in FIG. 1 in which the filter 15 extends across the optical axis X—X, However, if the magazine 18 is replaced by a second magazine (not shown) which contains a supply of black-and-white daylight film or daylight color film, the face 22a on the marker 22 of such second magazine is flush with the edge 18a and the marker 22 will automatically turn the rotor 62 in a counterclockwise direction (arrow b) to thereby rock the lever 16 in a clockwise direction in order to withdraw the filter 15 from the path of incoming light rays. Such angular displacement of the lever 16 takes place in the direction indicated by an arrow c which is shown in FIG. 1.

In addition to being movable by a magazine 18 which contains daylight film, the filter 15 may be moved out of the path of incoming light rays in response to depression of the pusher 79. This pusher 79 is permanently biased by a helical return spring 106 which tends to move it away from the bracket 76. The pusher 79 cooperates with a detent which can automatically hold the filter 15 in inoperative position. The detent comprises a locking lever 80 which is fulcrumed at 81 and is biased by a spring 82 which tends to rock it in a counterclockwise direction as the parts appear in FIG. 1 and thus tends to maintain the locking lever 80 in abutment with the leg 76a of the bracket 76. The upper edge face of the locking lever 80 is formed with a depression or recess 83 adjacent to a projection or tooth 83a having a slanting flank along which the leg 76a can slide in response to depression of the pusher 79. If the operator decides to depress the pusher 79 against the bias of the return spring 106 (see the arrow f in FIG. 1), the inner end portion of the pusher bears against the bracket 76 and causes the leg 76a to slide along the slanting flank of the tooth 83a and to ultimately enter the recess 83. This insures that the filter 15 is releasably locked in inoperative position because the rotor 62 cannot follow the bias of the return spring 69.

The camera is further provided with a disengaging unit including a manually depressible pusher 85 which serves to disengage the locking lever 80 from the bracket 76, i.e., to release the detent, and to thus permit return movement of the filter 15 to operative position. The pusher 85 is biased upwardly by a helical return spring 86 and its lower end portion abuts against a ledge or platform 87 provided on the locking lever 80 of the detent. By depressing the pusher 85, the operator rocks the lever 80 in a direction counter to that indicated by the arrow g whereby the tooth 83a descends to a level below the leg 76a and the bracket 76 can follow the bias of the spring 69 to automatically return the filter 15 to operative position. The pusher 79 will be depressed when the user wishes to move the filter 15 to inoperative position despite the fact that the magazine which is accommodated in the housing 1 contains a supply of artificial-light film. This might be necessary to achieve a special effect and, in order to reset the camera for normal operation with artificial-light film, the operator simply depresses the pusher 85 (arrow h) so that the locking lever 80 is disengaged from the bracket 76 and the spring 69 contracts to return the filter 15 to operative position in which the follower 67 enters the marker 22.

In addition to being disengageable by hand (i.e., in response to manual depression of the pusher 85), the locking lever 80 may be disengaged from the bracket 76 in automatic response to connection of a suitable flash unit 88 which is shown in the upper part of FIG. 1. This flash unit 88 has two terminals or prongs 89 which are receivable in sockets 90 provided therefor in the top wall of the housing 1. The underside of the base 88a of the flash unit 88 serves as a means for automatically depressing the disengaging pusher 85 when the prongs 89 are properly received in the respective sockets 90. Thus, proper attachment of the flash unit 88 to the motion picture camera results in automatic return movement of the filter 15 to operative position because the pusher 85 disengages the locking lever 80 of the detent from the bracket 76.

The underside of the base 88a on the flash unit 88 is further provided with a depression or recess 102 whose bottom surface serves to depress a further pusher 91 which is parallel with the pusher 85 and also extends upwardly and beyond the top wall of the housing 1. This third pusher 91 is biased upwardly by a return spring 92 and its lower end portion rests on a platform or ledge provided on one arm of a small control lever 93 which is rockable on a fixed horizontal pin 94. The other arm of the control lever 93 has an elongated guide slot 95 for a pin-shaped follower 96 secured to a reciprocable slide 97. The latter is guided in fixed ways 98 which allow it to move back and forth (in and counter to the direction indicated by the arrow l) and to thereby shift a mask 100 which is located in front of an indicator 101. The mask 100 is provided at one end of the slide 97 and the other end of this slide is formed with a slot loosely receiving a bent-over pin 99 which is fixedly secured to the leg 76a of the bracket 76.

The indicator 101 is located in the path of light rays coming from the direction indicated by an arrow i and is provided with two symbols adapted to permit passage of light rays therethrough. The indicator 101 is preferably installed in the viewfinder of the camera so that it is automatically visible to a person looking through the ocular of the viewfinder. The symbol T shown in FIG. 1 on the indicator 101 signifies to the user that the camera is set for operation in daylight. The other symbol (for example, a letter K) will indicate to the user that the camera is set for operation in artificial light. Of course, the indicator 101 need not be mounted in the viewfinder since it is equally possible to place it behind a separate observation window provided therefor in the housing 1.

The depth of the recess 102 in the underside of the base 88a on the flash unit 88 is selected in such a way that, when the user attaches the flash unit to the housing 1, the underside of the base 88a depresses the pusher 85 before the pusher 91 is depressed by the bottom surface in the recess 102. The pusher 85 is displaced in the direction indicated by the arrow h and disengages the locking lever 80 of the detent from the leg 76a of the bracket 76 by rocking the locking lever in a direction counter to that indicated by the arrow g. The pusher 91 is depressed with a certain delay and moves downwardly against the bias of the return spring 92 to rock the control lever 93 in a clockwise direction (see the arrow k in FIG. 1). The control lever 93 shifts the slide 97 in a direction to the right (see the arrow l in FIG. 1) whereby the pin 99 moves the bracket 76 in a counterclockwise direction (as indicated by the arrow b) so that the lever 16 is rocked in a clockwise direction (as indicated by the arrow c) and moves the filter 15 to inoperative position, namely, from the path of light rays travelling along the optical axis X—X. At the same time, the mask 100 moves in front of the symbol T and exposes the other symbol K which indicates to the operator that the camera is set for use in artificial light. Such shifting of the mask 100 will also take place in automatic response to insertion of a magazine 18 which contains a supply of artificial-light film and whereon the motion transmitting face 22a is flush with the edge 18a. The mask 100 will automatically expose the aforementioned symbol T on the indicator 101 when the magazine 18 which is accommodated in the housing 1 contains a supply of daylight film.

When the flash unit 88 is detached from the housing 1, the spring 92 is allowed to expand ahead of the spring 86 and allows the pusher 91 to return to the upper end position. The pusher 85 follows with a certain delay and allows the spring 82 to contract; however, such delay suffices to prevent the locking lever 80 of the detent from interfering with movement of the bracket 76 to the position shown in FIG. 1.

The improved motion picture camera is further provided with releasing means for insuring that the filter 15 returns to operative position in automatic response to withdrawal of a magazine 18 from its chamber in the housing 1, i.e., also in the event that the operator has previously depressed the pusher 79 to move the leg 76a of the bracket 76 into the recess 83 of the locking lever 80. To this end, the rotor 66 carries a bent over releasing or disengaging arm 103 having an inclined face 104 which engages a pin 105 on the locking lever 80 of the detent as soon as the magazine 18 is removed in a direction counter to that indicated by the arrow a, namely, as soon as the spring 70 is allowed to contract. The pin 105 rocks the locking lever 80 in a direction counter to that indicated by the arrow g whereby the tooth 83a descends to a level below the leg 76a and the spring 69 can return the arm 75 and the bracket 76 to the positions shown in FIG. 1. The spring 69 then turns the rotor 62 in a direction counter to that indicated by the arrow b.

If the magazine 18 shown in FIGS. 1 and 2 contains a supply of artificial-light film 20 whose sensitivity corresponds to DIN 15, the faces 21a, 22a of the adjusting elements or markers 21, 22 respectively engage the motion transmitting followers 68, 67 so that, during insertion of the magazine in the direction of the arrow a, the carriers or rotors 62, 66 are caused to turn in a counter-clockwise direction (arrow b). The extent to which the rotors 62 turn need not be the same and, when the magazine 18 is properly inserted in its chamber, the selector contacts 43, 44, 45 of the auxiliary switches 34c, 34b, 34a respectively engage the secondary contacts 48, 52 and 56 as shown in FIG. 3. Depending on the selected motor speed (by means of the adjusting knob 23), one of the compensating resistors B, C, D is connected in circuit with the moving-coil instrument 12. This will be readily understood because, depending on the angular position of the shaft 26, the main contact 35 will engage the complementary contact 36, 37 or 38.

During insertion of the magazine 18, the rotor 62 is turned through a very small angle because the filter 15 should remain in operative position. The angular displacement of the follower 68 suffices to move the inclined face 104 of the releasing arm 103 on the rotor 66 away from the pin 105 on the locking lever 80. Since the filter 15 is a conversion filter and remains in operative position, the artificial-light film in the magazine 18 can be used for taking pictures in daylight.

In order to take pictures in artificial light, the operator can proceed as follows: He can depress the pusher 79 (arrow f) so as to move the filter 15 to inoperative position because the leg 76a of the bracket 76 enters the recess 83 of the locking lever 80. Alternatively, and if the operator decides to take pictures in artificial light produced by the flash unit 88, the base 88a of the flash unit automatically depresses the pusher 91 (arrow h) which, through the intermediary of slide 97 and pin 99, displaces the bracket 76 to the extent necessary to move the filter 15 away from the optical axis.

If the operator replaces the magazine 18 of FIGS. 1 and 2 with a second magazine which contains daylight film having the same sensitivity (DIN 15), the face 21a on the marker 21 of the second magazine displaces the follower 68 through the same angle as the preceding magazine because the sensitivities of both films are the same. However, the face 22a on the marker 22 of the second magazine is flush with the edge 18a and, therefore, the follower 67 is turned through a larger angle (arrow b) and the selector contacts 43, 44, 45 respectively engage the secondary contacts 47, 51 and 55. At the same time, the arm 75 of the rotor 62 causes the bracket 76 to move the filter 15 to inoperative position. The film in the second magazine can be a black-and-white film or a daylight color film, as long as its sensitivity is 15 DIN.

As stated before, removal of a magazine 18 from the chamber in the housing 1 automatically results in opening of the control switch 28 because the cam 74 then assumes in angular position in which the resilient contact 28a of the control switch 28 moves away from the fixed contact. Such automatic opening of the control switch 28 brings about savings in electrical energy and prevents the motor 59 from running when the housing 1 does not accommodate a magazine.

The purpose of the master switch 30 is to deenergize the electric circuit when the magazine 18 is properly inserted in the housing 1 but the camera is not in actual use. The switch 30 is manipulated by hand and is closed only when the operator actually decides to take pictures. If desired, the master switch 30 can be coupled with the motor switch 60, i.e., it can be opened and closed by the actuating lever 61. The closing of switches 30 and 60 may be effected simultaneously or sequentially i.e., the lever 61 could be arranged to close the master switch 30 immediately ahead of the motor switch 60.

In the embodiment which is illustrated in FIGS. 1 to 3, the camera is intended for use with films whose sensitivities vary by two thirds of a full step (i.e., by 2 DIN values). The same difference (2 DIN values) is achieved by moving the filter 15 to or from operative position. However, it is clear that the number of compensating resistors and the number of contacts on the selector switches may be selected in such a way that the camera may be used with films having four, five or more different sensitivities, for example, with films whose sensitivity is 13, 15, 17, 19, 21, etc. DIN. The same holds true for the number of different motor speeds and for the exact value of such speeds. For example, instead of being adjustable to advance the film 20 at speeds of 10, 16 and 25 frames per second, the motor 59 can be constructed to advance the film at 12, 18 and 28 frames per second or at any other practical series of different speeds. It is equally possible to select the filter 15 in such a way that, when moved to operative position, this filter reduces the intensity of incoming light by four thirds of a full step (4 DIN). In such a modified camera, the positioning of contacts on the selector switches must be changed accordingly so that the switches will invariably connect the moving-coil instrument 12 in circuit with a proper compensating resistor when the filter is moved to or from operative position. In other words, the different values of film sensitivity, the different values of film (motor) speed and the different filter values are then graded substantially in the same way as successive values of a geometrical progression or series with a ratio of $2^{2/3}$.

Figure 5:
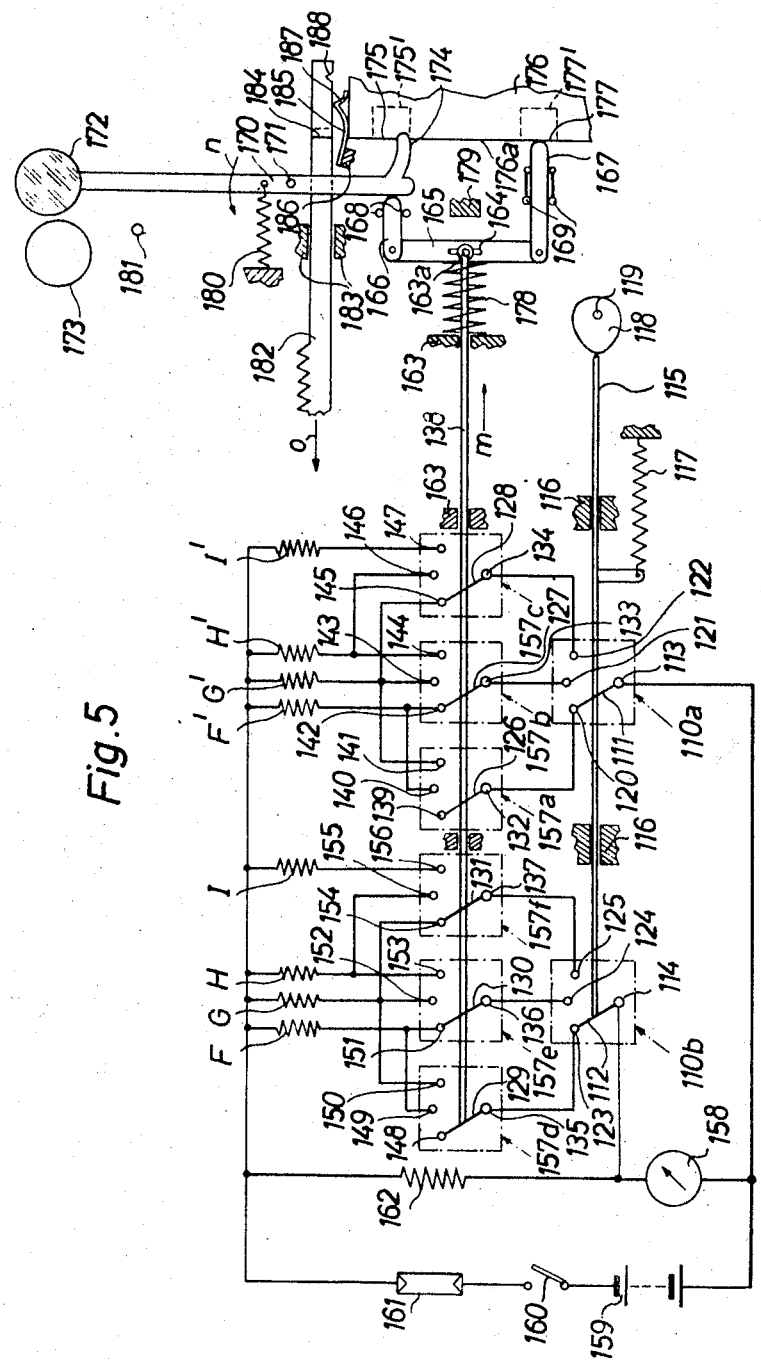
FIG. 5 is a fragmentary perspective view of a modified motion picture camera which embodies an integrator unit.

FIG. 5 illustrates the electric circuit and certain other parts of a modified motion picture camera which allows for more accurate consideration of various factors which can affect the quality of exposures. The mechanism which controls movements of a conversion filter 172 is simpler though perhaps somewhat less versatile than the mechanism which was described in connection with FIGS. 1 to 3. The electric circuit comprises two main selector switches 110a, 110b each of which respectively includes a movable main contact 111, 112 and three complementary or secondary contacts 120–122 and 123–125. The main contacts 111, 112 are respectively turnable about shafts 113, 114 can be displaced as a unit by means of a common push rod 115. The push rod is guided in fixed bearings 116 and is biased by a helical spring 117 which tends to maintain its right-hand end in engagement with the face of a rotary disk cam 118 mounted on an adjusting shaft 119 corresponding to the adjusting shaft 26 of FIG. 2. The knob 23 which serves to change the angular position of the adjusting shaft 119 is not shown in FIG. 5.

The camera of FIG. 5 is again assumed to be usable with films having three different sensitivities which differentiate by two thirds of a step (i.e., by 2 DIN). This explains the provision of three complementary or secondary contacts 120–122 and 123–125 in each of the main selector switches 110a, 110b. These complementary contacts 120–125 are respectively connected with main contacts or selector contacts 126–131 forming part of two sets of auxiliary selector switches 157a–157c and 157d–157f and rotatable on shafts or pins 132–137. The auxiliary switches 157a–157f have groups of complementary or secondary contacts 139–141, 142–144, 145–147, 148–150, 151–153 and 154–156. All of the selector contacts 126–131 are turnable by a common motion transmitting member or push rod 138 which is guided in bearings 163.

The two main selector switches 110a, 110b and the two sets of auxiliary selector switches 157a–157c and 157d–157f can selectively connect the moving coil instrument 158 and/or the series resistor 162 in circuit with a pair of compensating resistors F, F' or G, G' or H, H' or I, I'. The selector switches may also assume positions in which the moving-coil instrument 158 is disconnected from all of the resistors F–I and F'–I'. The moving-coil instrument 158 is connected in series with the resistor 162, with a primary source 159 of electrical energy, with a master switch 160 and with a light-sensitive resistor 161. The group of compensating resistors F–I, the corresponding set of auxiliary selector switches 157d–157f, and the associated main selector switch 110b are arranged in such a way that selected resistors F–I may be connected in parallel with the series resistor 162. The other group of compensating resistors F′–I′, the corresponding set of auxiliary selector switches 157a–157c, and the associated main selector switch 110a are arranged in such a way that selected resistors F′–I′ may be connected in parallel with the series resistor 162 and with the moving-coil instrument 158.

The right-hand end portion of the motion transmitting push rod 138 carries a pin 163a which is received in an elongated slot 164 provided in a two-armed integrator lever 165. A spring 178 surrounds the push rod 138 between the right-hand bearing 163 and the lever 165 to bias this push rod in a direction to the right (see the arrow m) so that, when the push rod 138 assumes its extreme right-hand end position, the lever 165 abuts against a fixed stop 179. The two arms of the lever 165 are articulately coupled with followers here shown as links 166, 167 which are guided by pins 168, 169 in such a way that they can reciprocate along two substantially straight paths. The unconnected end of the link 166 is adjacent to one arm of a two-armed lever or holder 170 which is rockable on a pin 171 and supports a conversion filter 172. When the lever 170 is rocked in a counterclockwise direction (arrow n), it can move the filter 172 from the inoperative position of FIG. 5 to an operative position in which the filter extends across the path of light rays passing through a circular opening provided in a fixed plate 173 of the camera. The opening in the plate 173 can receive light rays through the lens system of the camera.

The lower arm of the lever 170 carries a follower 174 which cooperates with an adjusting element or marker 175 on the adjoining panel of the magazine 176. The marker 175 indicates that the magazine 176 contains a supply of daylight color film or daylight black-and-white film; therefore, the filter 172 is moved away from the opening in the plate 173. The marker 175 is formed by a portion of the exposed surface 176a on the corresponding panel of the magazine 176. If the magazine which is to be used in the camera of FIG. 5 contains artificial-light film, its adjusting element or marker 175′ is formed by a recess which is indicated in FIG. 5 by broken lines.

The free end portion of the lower link 167 cooperates with a second adjusting element or marker 177 of the magazine 176. In the embodiment of FIG. 5, the second marker 177 also constitutes a portion of the exposed surface 176a; however, if the magazine contains film whose sensitivity is different from that of the film in the magazine 176 of FIG. 5, the marker 177 will constitute a recess 177′ which is indicated by broken lines. For example, the film in the magazine 176 of FIG. 5 can be assumed to have a sensitivity of 17 DIN. The film which is stored in the magazine having a marker 177′ will have a sensitivity of DIN 15.

The lever 165 and the links 166, 167 form part of an integrator unit which can adjust the push rod 138 by full consideration of several factors including the sensitivity of film in the magazine 176 (marker 177) and the desirability to move the conversion filter 172 into or from the path of light rays (marker 175). The spring 178 insures that the links 166, 167 invariably abut against the lever 170 and against the marker 177 or, in response to removal of the magazine 176, that the lever 165 bears against the aforementioned stop 179. When the lever 165 abuts against the stop 179, the link 166 automatically maintains the filter 172 in operative position, namely, in a position of registry with the opening in the plate 173. The lever 170 itself is permanently biased by a return spring 180 which tends to maintain the filter 172 in operative position. The movement of the lever 170 in the direction of the arrow n is limited by a fixed stop 181 which is positioned in such a way that, when engaged by the lever 170, it holds the filter 172 in registry with the aforementioned opening.

As stated hereinabove, the filter 172 automatically remains in operative position when the magazine has a marker 175′, i.e., when the magazine contains a supply of artificial-light film. In order to allow for movement of the filter 172 from such operative position (despite the fact that the camera is loaded with artificial-light film), the structure shown in FIG. 5 further comprises a manually operable member here shown as a pusher 182 which resembles a slide and is guided in fixed ways 183. This pusher 182 can be shifted by hand and has a motion transmitting projection or shoulder 184 which can be moved against the lower arm of the lever 170 when the slide is shifted in the direction indicated by an arrow o. The detent means for locking the slide 182 in such operative position (in which the slide maintains the filter 172 in inoperative position) comprises a resilient element here shown as a leaf spring 185 having a tooth 187 which can enter a notch 188 in the lower edge face of the slide 182. The leaf spring 185 is anchored in a stationary frame member 186 of the motion picture camera and can be flexed upwardly by the top panel of the magazine 176. When the magazine 176 is removed from the housing, the leaf spring 185 is permitted to move away from the slide 182 and its tooth 187 is withdrawn from the notch 188. This insures that the filter 172 automatically returns to operative position (under the bias of the spring 180) when the magazine is removed from the camera housing because the spring 185 is then disengaged from the slide 182. In response to insertion of a magazine 176, its upper panel bears against and deforms the leaf spring 185 so that the tooth 187 bears against the lower edge face of the slide 182 and enters the notch 188 as soon as the slide is displaced sufficiently to move the filter 172 to inoperative position.

As stated before, the magazine 176 shown in FIG. 5 is assumed to contain a supply of daylight film which may be a color film or a black-and-white film and whose sensitivity is DIN 17. Therefore, the marker 175 automatically holds the filter 172 in inoperative position and the link 167 (controlled by the marker 177) insures that the push rod 138 performs a stroke of maximum length while moving in a direction to the left, as viewed in FIG. 5, i.e., counter to the direction indicated by the arrow m. The angular position of the selector shaft 119 corresponds to a minimum motor speed of ten frames per second. In such position of the selector shaft 119 (push rod 115) and push rod 138, all of the compensating resistors F–I and F′–I′ are disconnected from the circuit of the moving-coil instrument 158 and series resistor 162.

If the magazine 176 of FIG. 5 is replaced by a second magazine which contains a supply of artificial-light film having the same speed (DIN 17) as the daylight film in the magazine 176, the position of the link 167 remains unchanged because the respective marker on the second magazine is positioned in the same way as the marker 177 on the magazine 176 of FIG. 5. However, and since a magazine which contains artificial-light film is provided with a marker 175′, the filter 172 remains in registry with the aperture in the plate 173 which means that the spring 178 urges the link 166 to a position to the right and beyond the position of FIG. 5. The corresponding axial displacement of the push rod 138 in the direction of the arrow m suffices to adjust the auxiliary selector switches 157a–157f in such a way that the selector contacts 126–131 respectively engage the complementary contacts 140, 143, 146, 149, 152 and 155. If the motor speed remains unchanged, the selector switches connect the moving-coil instrument 158 and series resistor 162 in circuit with the resistors F and F′. This insures that the setting of the camera corresponds to that when the magazine contains a daylight film having a sensitivity of DIN 15 despite the fact that the camera is actually loaded with film having a sensitivity of DIN 17. In other words, the push rod 138 would assume the same position if the artificial-light film in the aforediscussed second magazine were replaced by a daylight film having the sensitivity equal to DIN 15. In the latter instance, the lever 170 and link 166 would assume the positions shown in FIG. 5 but the link 167 would extend into the marker 177' so that the push rod 138 would again assume a position in which the contacts 126–131 would engage the contacts 140, 143, 146, 149, 152 and 155. In other words, either the link 166 or the link 167 can cause the push rod 138 to assume an axial position in which the instrument 158 and series resistor 162 are connected in circuit with the compensating resistors F and F'. These resistors F and F' can be connected in the circuit of the components 158, 162 if the motor speed is changed from 10 to 16 while the magazine 176 of FIG. 5 remains in the housing of the motion picture camera. Such change in speed of the motor is brought about by rotating the selector shaft 119 through 90 degrees. The contacts 111, 112 then engage the complementary contacts 121, 124 and, since the axial position of the push rod 138 remains unchanged, the resistors F, F' remain connected in circuit but through the contacts 130, 127.

Since the slide 182 can rock the lever 170, and since the lever 170 can change the position of the link 166, manual displacement of the slide 182 will also change the axial position of the push rod 138, i.e., the electric circuit is properly adjusted in a fully automatic way regardless of whether the filter 172 is caused to change its position in response to manually induced or magazine-induced displacement of the filter 172.

Figure 6:
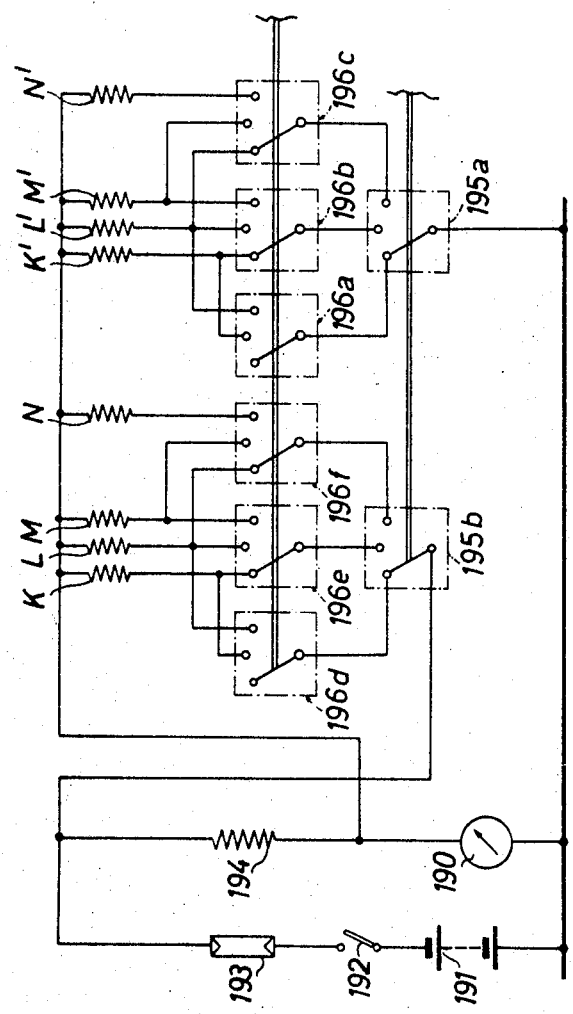
FIG. 6 illustrates the electric circuit of a third camera.

Referring finally to FIG. 6, there is shown the electric circuit of a further motion picture camera. The mechanical components of this camera are identical with those which were described in connection with FIG. 5 and, therefore, such components are not shown in FIG. 6. The moving-coil instrument 190 is connected in series with a primary source 191 of electrical energy, a master switch 192 (or a control switch), a light-sensitive resistor 193, and a series resistor 194. A selected one of a first group of compensating resistors K', L', M', N' may be connected in parallel with the moving-coil instrument 190 or disconnected from this instrument in response to requisite adjustment of a main selector switch 195a and a set of three auxiliary selector switches 196a, 196b, 196c. A second main selector switch 195b and a second set of auxiliary selector switches 196d, 196e, 196f can be adjusted to connect the series resistor 194 in parallel with or to disconnect the resistor 194 from a selected one of a second group of compensating resistors K, L, M and N. In this embodiment of the present invention, too, the resistors K, K' or L, L' or M, M' or N, N' are always connected or disconnected in pairs. An important advantage of the circuit shown in FIG. 6 is that it can accurately select the exposure value (diaphragm opening) as a function of several variables by means of a pin-and-slot connection such as the connection 8–11 of FIG. 2. Another important advantage which is common to all embodiments of the present invention is seen to reside in that each compensating resistor (or several compensating resistors) may be used repeatedly for different adjustments of the diaphragm 300, i.e., that the number of compensating resistors is less than the overall number of different adjustments.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a camera, an adjustable diaphragm; an exposure meter coupled with said diaphragm and including light-sensitive means for adjusting said diaphragm as a function of the brightness of a subject, a source of electrical energy connected in circuit with said light-sensitive means, a series of compensating resistor means, at least one main selector switch means, and a plurality of auxiliary selector switch means controlled by said main selector switch means and arranged to connect selected resistor means into said circuit to thereby effect further adjustments of said diaphragm as a function of several factors other than said brightness, at least one of said resistor means being connected in said circuit in response to at least two different adjustments of said diaphragm; and adjusting means for adjusting said switch means as a function of said other factors, said adjusting means comprising at least one adjusting element for automatically adjusting said switch means as a function of at least one of said other factors.

2. A structure as set forth in claim 1, wherein each of said resistor means offers a different resistance to the flow of electric current and wherein the difference between the resistances of successive resistor means of said series is the same.

3. A structure as set forth in claim 1, wherein said main switch means comprises at least one main contact and a plurality of complementary contacts each connected with one of said auxiliary switch means, said adjusting means including a further adjusting element for placing said main contact into current conducting engagement with a selected complementary contact.

4. A structure as set forth in claim 1, wherein said main switch means comprises a plurality of main switches, one for each set of auxiliary switches.

5. A structure as set forth in claim 1, wherein said factors include different values of film sensitivity, different values of film speed, and different filter values, and wherein the values of at least one of said factors are graded substantially as successive values of a geometrical progression with a ratio of $2^{\frac{2}{3}}$.

6. A structure as set forth in claim 1, wherein said exposure meter further comprises a moving-coil instrument and a series resistor, said resistor and said instrument being connected in series with said source and with said light-sensitive means.

7. A structure as set forth in claim 6, wherein said source includes a primary source of electrical energy and a secondary source connected in parallel with said primary source.

8. A structure as set forth in claim 6, wherein said switch means are arranged to connect selected compensating resistor means in parallel with said instrument and said series resistor.

9. A structure as set forth in claim 1, wherein said camera further comprises a housing defining a chamber for reception of film-containing magazines of the type having adjusting elements whose position with reference to the remainder of the respective magazine is indicative of the sensitivity of film in such magazine, the adjusting element of that magazine which is received in said chamber constituting said one adjusting element and being arranged to adjust said switch means to thereby connect into said circuit such resistor means whose resistance is proportional to the sensitivity of film in said last mentioned magazine.

10. A structure as set forth in claim 9, further comprising conversion filter means movable between two positions in the first of which said filters means extends across the path of incoming light, each of said magazine further including a second adjusting element arranged to effect movement of said filter means to one of said positions.

11. A structure as set forth in claim 9, wherein said circuit further comprises normally open control switch means and trip means for closing said control switch means in response to insertion of a magazine into said housing.

12. In a camera, an adjustable diaphragm; an exposure meter coupled with said diaphragm and including light-sensitive means for adjusting the diaphragm as a function of the brightness of a subject, a source of electrical energy connected in circuit with said light-sensitive means, a series of compensating resistor means, at least one main selector switch means, and a plurality of auxiliary selector switch means controlled by said main switch means and arranged to connect selected resistor means into said circuit to thereby effect further adjustments of said diaphragm as a function of factors other than said brightness, said main switch means comprising at least one main contact and a plurality of complementary contacts each connected with one of said auxiliary switch means and each of said auxiliary switch means comprising a selector contact and a group of secondary contacts, each of said selector contacts being adapted to be placed in current conducting engagement with a selected secondary contact of the respective group; and adjusting means for adjusting said switch means as a function of said other factors, said adjusting means including an adjusting element for placing said main contact into current conducting engagement with a selected complementary contact, a pair of carrier means respectively supporting said selector contacts and said groups of secondary contacts, and means for moving at least one of said carrier means to account for at least one of said other factors.

13. A structure as set forth in claim 12 wherein each of said carrier means is movable independently of the other carrier means.

14. A structure as set forth in claim 13, further comprising conversion filter means movable into and from the path of incoming light, one of said carrier means being movable to account for different film sensitivities and the other carrier means being movable to change the position of said filter means.

15. A structure as set forth in claim 12, wherein each of said carrier means resembles a disk and further comprising a common shaft for said carrier means.

16. A structure as set forth in claim 15, wherein said camera further comprises a housing for reception of film-containing magazines of the type having adjusting elements whose position with reference to the remainder of the respective magazine indicates whether the magazine contains daylight film or artificial-light film, and conversion filter means mounted in said housing and movable across and away from the path of incoming light so that, while extending across said path, the filter means enables the camera to take daylight pictures with artificial-light film, one of said carrier means being rockable about the axis of said shaft by an adjusting element provided on a magazine containing artificial-light film and said one carrier means comprising means for moving said filter means away from said path in response to insertion of such magazine into said housing.

17. A structure as set forth in claim 16, wherein each of said magazines further comprises a second adjusting element whose position with reference to the remainder of such magazine is indicative of the sensitivity of film contained therein, the other of said carrier means being movable by the second adjusting element of a magazine which is inserted into said housing, said adjusting means further comprising detent means for releasably holding said filter means away from said path and said other carrier means comprising means for releasing said detent means in response to removal of a magazine from said housing so that said filter means can return to operative position in which it extends across said path.

18. In a camera, an adjustable diaphragm; an exposure meter coupled with said diaphragm and including light-sensitive means for adjusting the diaphragm as a function of the brightness of a subject, a source of electrical energy connected in circuit with said light-sensitive means energy connected in circuit with said light-sensitive means, a series of compensating resistor means, at least one main selector switch means, and a plurality of auxiliary selector switch means controlled by said main switch means and arranged to connect selected resistor means into said circuit to thereby effect further adjustments of said diaphragm as a function of factors other than said brightness, each of said auxiliary switch means comprising a group of secondary contacts each connected to one of said resistor means and a selector contact adapted to be placed into current-conducting engagement with selected secondary contacts of the respective group; adjusting means for adjusting said switch means as a function of said other factors; a housing defining a chamber for reception of film-containing magazines of the type having adjusting elements whose position with reference to the remainder of the respective magazine is indicative of the sensitivity of film in such magazine, the adjusting element of that magazine which is received in said chamber forming part of said adjusting means and being arranged to adjust said switch means to thereby connect into said circuit such resistor means whose resistance is proportional to the sensitivity of film in said last mentioned magazine, said adjusting means further comprising first and second movable carrier means respectively supporting said selector contacts and said groups of secondary contacts and a pair of motion transmitting means each arranged to effect a predetermined movement of one of said carrier means in response to engagement by one of said adjusting elements during insertion of a magazine into said housing; and conversion filter means movable between two positions in the first of which said filter means extends across the path of incoming light, each of said magazines further including a second adjusting element arranged to effect movement of said filter means to one of said positions.

19. A structure as set forth in claim 18, wherein each of said motion transmitting means comprises a follower connected with the respective carrier means and means for biasing said followers against the respective adjusting elements.

20. In a camera, an adjustable diaphragm; an exposure meter coupled with said diaphragm and including light-sensitive means for adjusting the diaphragm as a function of the brightness of a subject, a source of electrical energy connected in circuit with said light-sensitive means, a series of compensating resistor means, at least one main selector switch means, and a plurality of auxiliary selector switch means controlled by said main switch means and arranged to connect selected resistor means into said circuit to thereby effect further adjustments of said diaphragm as a function of factors other than said brightness; adjusting means for adjusting said switch means as a function of said other factors; a housing defining a chamber for reception of film-containing magazines of the type having adjusting elements whose position with reference to the remainder of the respective magazine is indicative of the sensitivity of film in such magazine, the adjusting element of that magazine which is received in said chamber forming part of said adjusting means and being arranged to adjust said switch means to thereby connect into said circuit such resistor means whose resistance is proportional to the sensitivity of film in said last mentioned magazine; conversion filter means movable between two positions in the first of which said filter means extends across the path of incoming light, each of said magazines further including a second adjusting element arranged to effect movement of said filter means to one of said positions, said adjusting means further comprising manually operated means for moving said filter means from said first position to a second position; detent means for releasably holding the filter means in said second position; and releasing means for disengaging said detent means in response to removal of a magazine from said housing.

21. In a camera, an adjustable diaphragm; an exposure meter coupled with said diaphragm and including light-sensitive means for adjusting the diaphragm as a function of the brightness of a subject, a source of electrical energy connected in circuit with said light-sensitive means, a series of compensating resistor means, at least one main selector switch means, and a plurality of auxiliary selector switch means controlled by said main switch means and arranged to connect selected resistor means into said circuit to thereby effect further adjustments of said diaphragm as a function of factors other than said brightness; adjusting means for adjusting said switch means as a function of said other factors; a housing defining a chamber for reception of film-containing magazines of the type having adjusting elements whose position with reference to the remainder of the respective magazine is indicative of the sensitivity of film in such magazine, the adjusting element of that magazine which is received in said chamber forming part of said adjusting means and being arranged to adjust said switch means to thereby connect into said circuit such resistor means whose resistance is proportional to the sensitivity of film in said last mentioned magazine; conversion filter means movable between two positions in the first of which said filter means extends across the path of incoming light, each of said magazines further including a second adjusting element arranged to effect movement of said filter means to one of said positions, said adjusting means further comprising a device operative in response to attachment of a flash unit to said housing to move the filter means from said first position, said device comprising manually operated means for moving the filter means from said first position, detent means for releasably holding the filter means away from said first position, and disengaging means operative in response to attachment of a flash unit to said housing for releasing said detent means.

22. In a camera, an adjustable diaphragm; an exposure meter coupled with said diaphragm and including light-sensitive means for adjusting the diaphragm as a function of the brightness of a subject, a source of electrical energy connected in circuit with said light-sensitive means, a series of compensating resistor means including two groups of compensating resistors, at least one main selector switch means, a plurality of auxiliary selector switch means controlled by said main switch means and arranged to connect selected resistor means into said circuit to thereby effect further adjustments of said diaphragm as a function of factors other than said brightness, a moving coil instrument and a series resistor, said series resistor and said instrument being connected in series with said source and with said light-sensitive means, said auxiliary switch means comprising two sets one of which is arranged to connect selected compensating resistors of one group in parallel with said series resistor and the other of which is arranged to connect selected compensating resistors of the other group in parallel with said instrument and with said series resistor; and adjusting means for adjusting said switch means as a function of said other factors.

23. In a camera, an adjustable diaphragm; an exposure meter coupled with said diaphragm and including light-sensitive means for adjusting the diaphragm as a function of the brightness of a subject, a source of electrical energy connected in circuit with said light-sensitive means, a series of compensating resistor means, at least one main selector switch means, a plurality of auxiliary selector switch means controlled by said main switch means and arranged to connect selected resistor means into said circuit to thereby effect further adjustments of said diaphragm as a function of factors other than said brightness, a moving coil instrument, and a series resistor, said series resistor and said instrument being connected in series with said source and with said light-sensitive means, said compensating resistor means comprising two groups of compensating resistors and said auxiliary switch means comprising two sets one of which is arranged to connect selected compensating resistors of one group in parallel with said series resistor and the other of which is arranged to connect selected compensating resistors of the other group in parallel with said instrument; and adjusting means for adjusting said switch means as a function of said other factors.

24. In a camera, an adjustable diaphragm; an exposure meter coupled with said diaphragm and including light-sensitive means for adjusting the diaphragm as a function of the brightness of a subject, a source of electrical energy connected in circuit with said light-sensitive means, a series of compensating resistor means, at least one main selector switch means, a plurality of auxiliary selector switch means controlled by said main switch means and arranged to connect selected resistor means into said circuit to thereby effect further adjustments of said diaphragm as a function of factors other than said brightness, a moving coil instrument, and a series resistor, said series resistor and said instrument being connected in series with said source and with said light-sensitive means and said auxiliary switch means comprising two sets each of which contains the same number of auxiliary switches; and adjusting means for adjusting said switch means as a function of said other factors.

25. In a camera, an adjustable diaphragm; an exposure meter coupled with said diaphragm and including light-sensitive means for adjusting the diaphragm as a function of the brightness of a subject, a source of electrical energy connected in circuit with said light-sensitive means, a series of compensating resistor means each of which offers a different resistance to the flow of electric current, the difference between the resistances of successive resistor means of said series being the same, at least one main selector switch means, and a plurality of auxiliary selector switch means controlled by said main switch means and arranged to connect selected resistor means into said circuit to thereby effect further adjustments of said diaphragm as a function of factors other than said brightness, some of said resistor means being arranged to be connected into said circuit by more than one of said auxiliary selector switch means; and adjusting means for adjusting said switch means as a function of said other factors.

26. In a camera, an adjustable diaphragm; an exposure meter coupled with said diaphargm and including light-sensitive means for adjusting the diaphargm as a function of the brightness of a subject, a source of electrical energy connected in circuit with said light-sensitive means, a series of compensating resistor means, at least one main selector switch means, and a plurality of auxiliary selector switch means controlled by said main switch means and arranged to connect selected resistor means into said circuit to thereby effect further adjustments of said diaphragm as a function of factors other than said brightness; and adjusting means for adjusting said switch means as a function of said other factors, said adjusting means comprising a plurality of adjusting elements each arranged to account for one of said other factors and integrator means for adjusting said auxiliary switch means in dependency on the position of said adjusting elements.

27. A structure as set forth in claim 26, wherein each of said auxiliary switch means comprises a selector contact and a group of secondary contacts, said integrator means comprising motion transmitting means for simultaneously adjusting all of said selector contacts to move such selector contacts into current-conducting engagement with selected secondary contacts of the respective groups, said secondary contacts being connected with said compensating resistor means.

28. A structure as set forth in claim 27, wherein said motion transmitting means comprises a push rod and wherein each of said selector contacts is coupled with said push rod.

29. A structure as set forth in claim 27, wherein said camera comprises a housing and wherein said adjusting elements are provided on a film-containing magazine which is removably received in said camera, one of said adjusting elements being indicative of the sensitivity of film in said magazine.

30. A structure as set forth in claim 29, further comprising conversion filter means movable across and from the path of incoming light to allow for taking of daylight pictures when extending across said path and when the magazine contains artificial-light film, another of said adjusting elements being indicative of the type of film in the respective magazine and being arranged to effect movement of said filter means away from said path when the magazine which is inserted into said housing contains daylight film.

31. A structure as set forth in claim 30, further comprising detent means for releasably holding said filter means away from said path.

32. A structure as set forth in claim 31, wherein said detent means comprises a member movable by hand to a predetermined position in which said filter means is moved away from said path and resilient means operative in response to insertion of a magazine into said camera to hold said member in such predetermined position.

References Cited

UNITED STATES PATENTS

| | | | |
|---|---|---|---|
| 2,186,611 | 1/1940 | Martin | 352—141 XR |
| 3,077,153 | 2/1963 | Gopfert | 95—10 XR |
| 3,085,486 | 4/1963 | Bushman et al. | 95—10 XR |
| 3,124,033 | 3/1964 | Freudenschuss | 352—141 |
| 3,165,037 | 1/1965 | Neudecker et al. | 95—10 |
| 3,176,599 | 4/1965 | Anwyl. | |
| 3,194,133 | 7/1965 | Benson. | |
| 3,208,363 | 9/1965 | Easterly et al. | 352—78 |

NORTON ANSHER, *Primary Examiner.*

J. F. PETERS, JR., *Assistant Examiner.*

U.S. Cl. X.R.

95—10, 31; 352—72, 141